(12) United States Patent
Bartholomew

(10) Patent No.: US 7,793,221 B1
(45) Date of Patent: Sep. 7, 2010

(54) METHOD AND SYSTEM FOR UNIT LEVEL MILITARY ADMINISTRATION

(76) Inventor: Damian Bartholomew, 14 Boy Scout Ct., Augusta, GA (US) 30905

( * ) Notice: Subject to any disclaimer, the term of this patent is extended or adjusted under 35 U.S.C. 154(b) by 176 days.

(21) Appl. No.: 11/464,803

(22) Filed: Aug. 15, 2006

(51) Int. Cl.
*G06F 3/00* (2006.01)

(52) U.S. Cl. .................. 715/743; 715/741; 715/744; 715/751; 715/768; 705/8

(58) Field of Classification Search ............ 715/742, 715/743, 751, 753, 759; 709/213–217; 705/8
See application file for complete search history.

(56) References Cited

U.S. PATENT DOCUMENTS

| | | | | |
|---|---|---|---|---|
| 5,544,062 | A * | 8/1996 | Johnston, Jr. | 700/117 |
| 5,781,731 | A * | 7/1998 | Koreeda et al. | 709/204 |
| 7,185,066 | B2 * | 2/2007 | Noble et al. | 709/217 |
| 7,284,203 | B1 * | 10/2007 | Meeks et al. | 715/751 |
| 7,287,227 | B2 * | 10/2007 | Ries et al. | 715/741 |
| 2008/0034296 | A1 * | 2/2008 | Bybee et al. | 715/741 |

OTHER PUBLICATIONS

Svendsen, E. C. and Ream, D. L. 1973. What's different about the hardware in tactical military systems. In Proceedings of the Jun. 4-8, 1973, National Computer Conference and Exposition (New York, New York, Jun. 4-8, 1973).*

Sprung, J. G. and Aggarwal, V. 1978. Simulation of a multiple CPU military communications system. In Proceedings of the 10th Conference on Winter Simulation—vol. 2 (Miami Beach, FL, Dec. 1, 1978).*

* cited by examiner

*Primary Examiner*—William L Bashore
*Assistant Examiner*—Meseker Takele
(74) *Attorney, Agent, or Firm*—Malcolm W. Pipes; Robert Groover; Groover & Associates

(57) ABSTRACT

The present invention provides a system for providing administrative support for a military unit. The invention includes a server-side database containing information about the military unit and a client-side browser application that provides a secure network connection to the database. Unit members can access the application to retrieve and edit the administrative information, wherein unit members can access administrative information specific to their respective responsibilities. These areas may include personnel, security, training and operations, logistics, communications and Information Systems, and chaplain services. Unit administrative information also includes information for a family support group for family members of personnel assigned to the military unit.

20 Claims, 15 Drawing Sheets

MyUnit

| | | | | | | |
|---|---|---|---|---|---|---|
| Main Information | S1 Family Support | S2 Next of Kin | S3 Rating Scheme | S4 Upcoming Ratings | Logout | Help Rater Profile |

1LT MILLER, LINDA J.                        Matches: 4

Family Information

| Name | Relation | Home Phone | Work Phone | Option |
|---|---|---|---|---|
| HUDSON, EARL | BROTHER | | | Remove |
| CAMPBELL, KAYLA | OTHER | 985-645-9467 | | Remove |
| CAMPBELL, JOSLYN | OTHER | 985-645-9467 | | Remove |
| CAMPBELL, REBA G. | CHILD | 985-645-9465 | | Remove |

[ Print Form 107-R ]    [ Add Family Member ]    [ Done ]

Fig. 9E

MyUnit

Edit Family Member

General Information

Order of Contact: [1]            Suffix: [ ]
First: EARL                      Gender: [M]
Last: HUDSON                     Birthday: [        ]
Middle: [ ]                      Relationship: [BROTHER]

Phone Numbers

Home: [ ]    Work: [ ]    ext. [ ]    Mobile: [ ]

Home Address

Address: [ ]
City: [ ]
State: [LA]
Zip Code: [ ]

Internet Information

E-mail: [ ]

Special Needs

Does this person speak English? [Yes]    If no, please enter language spoken: [ ]
Does this person have special needs? [No]    If yes, please identify needs: [ ]

Family Support

I prefer to receive Family Support related phone calls from FRG volunteers and members at:
[Other]
Other (Please Specify): [ ]
  [ ] It is ok to send me mail, including FRG Newsletter and information on activities.

Fig. 9F

METHOD AND SYSTEM FOR UNIT LEVEL MILITARY ADMINISTRATION

TECHNICAL FIELD

The present invention relates generally to an Internet based system for managing military units at the company level. Specifically, this application integrates the administration of staff functions relating to personnel, training, operations, logistics, and family support.

BACKGROUND OF THE INVENTION

Although military units vary based on their branch of service, mission, and composition, each contains the essential core components of personnel, equipment, training, and operations. Regardless of the distribution of these resources, a unit must be capable of four essential tasks:
1. Prepare for Deployment
2. Deployment
3. Sustainment
4. Re-deployment Throughout each of these tasks, the unit leadership is responsible for monitoring unit activities and preparing the necessary reports for senior or subordinate units. The manual processes implemented per unit will differ but there is a heavy reliance on manual efforts to update information and an extensive use of hard drive space to store that information as files.

In an attempt to improve their internal business processes, unit personnel often develop stand-alone applications of varying complexity to resolve certain problems. These non-standard solutions are limited to the technical ability of the individual, require continual maintenance (by the creator), and cease to exist when that individual departs the unit. Since this solution is usually maintained on one computer, it is not shared without allowing others to share that computer, resulting in a lack of continuity, an inability to rapidly report unit level information, and the generation of excessive soft-copy and hard-copy documents. As a dire consequence, other members of the same military unit often require the same information in a different format for a different reason, requiring duplication of work product to manage common data.

In recent years, the military has significantly invested in upgrading computers, networks, and increasing bandwidth for units throughout the world. Embracing the interne as a medium for exchanging data, large scale web-based portals have evolved to support military units and personnel at the Enterprise level. Each branch of the service has designed their own web sites to accomplish many useful utilities to include features such as email, chat, file repository, medical records management, orders history, and finance. However, these Internet solutions are only targeted at large scale organizational levels, e.g., Defense Finance and Accounting Service (DFAS), Regional Level Application Software (RLAS), Army Training Requirements and Resource System (AT-TRS). Although systems continue to evolve and powerful data repositories, there is no automated support at the unit level; e.g., team, squad, platoon, company, or battalion (BCT).

SUMMARY OF THE INVENTION

The present invention provides a system for providing integrated administrative information for a military unit. The invention includes a server-side database containing information about the military unit and a server-side application server which enables the security, persistence mechanisms, and accessibility through a secure network connection. Unit members can access the application through a client-side browser to retrieve and edit the administrative information specific to their respective responsibilities including personnel, security, training, operations, logistics, chaplain services, and family support. The family support sub-system is unique in its ability to coordinate personnel, family members, volunteers, and Family Support Group activities.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 9A is a sample screen depicting the tree-like access to information from the perspective of the unit staff;

FIG. 9B is a sample screen for equipment from the unit staff perspective;

FIG. 9C is a sample screen of the unit personnel;

FIG. 9D is a sample screen of the options available when one of the personnel is selected from the screen depicted in FIG. 9C;

FIG. 9E shows a sample screen of the family information from the personnel perspective;

FIG. 9F is a sample screen for editing a family member.

DETAILED DESCRIPTION OF THE DRAWINGS

The present invention supports the unit from the bottom-up perspective: the war-fighter. All the intricacies of daily unit operations are available from one distributed web portal which exists to support a unit from multiple locations: home, garrison, training or deployment. This information is vital to those members of a unit who need the ability to dynamically address unit level issues. Key benefits include:

- Supports military units of the United States military from all branches of service and all components.
- Provides a central repository of unit level information accessible from the internet.
- Functions on existing DOD issue hardware; requires no dedicated computer, client-side installation, or special downloads.
- Complements existing software systems.
- Integrates a web-based Family Support Group mechanism to provide a bridge between unit members, family members and volunteers.

The present invention can be used with a standard Internet connection and web browser.

Figure 1:
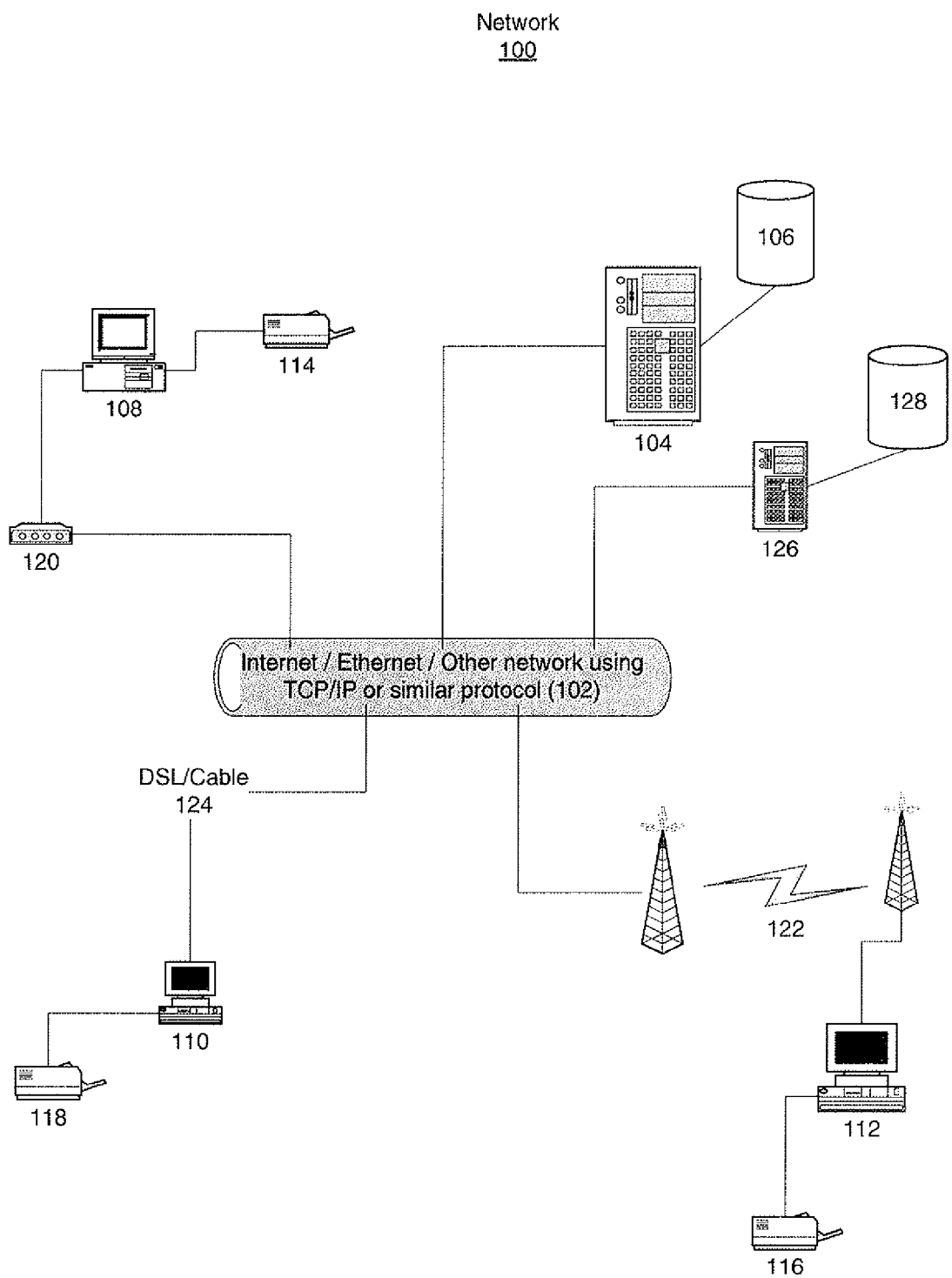
FIG. 1 is a pictorial representation of a network of data processing systems in which the present invention may be implemented.

With reference now to the figures, FIG. 1 is a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108-112. Network data processing system 100 might also contain a supplementary server 126 and additional data storage 128.

Clients 108, 110, and 112 are clients to server 104. Network data processing system 100 includes printers 114, 116, and 118, and may also include additional servers, clients, and other devices not shown. The means by which clients 108-112 connect to the network 102 may include conventional telephone landline 120, broadband Digital Service Line (DSL) or cable 124, or wireless communication network 122.

In the depicted example, network data processing system 100 is the Internet with network 102 representing a worldwide collection of networks and gateways that use the TCP/IP suite or similar protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
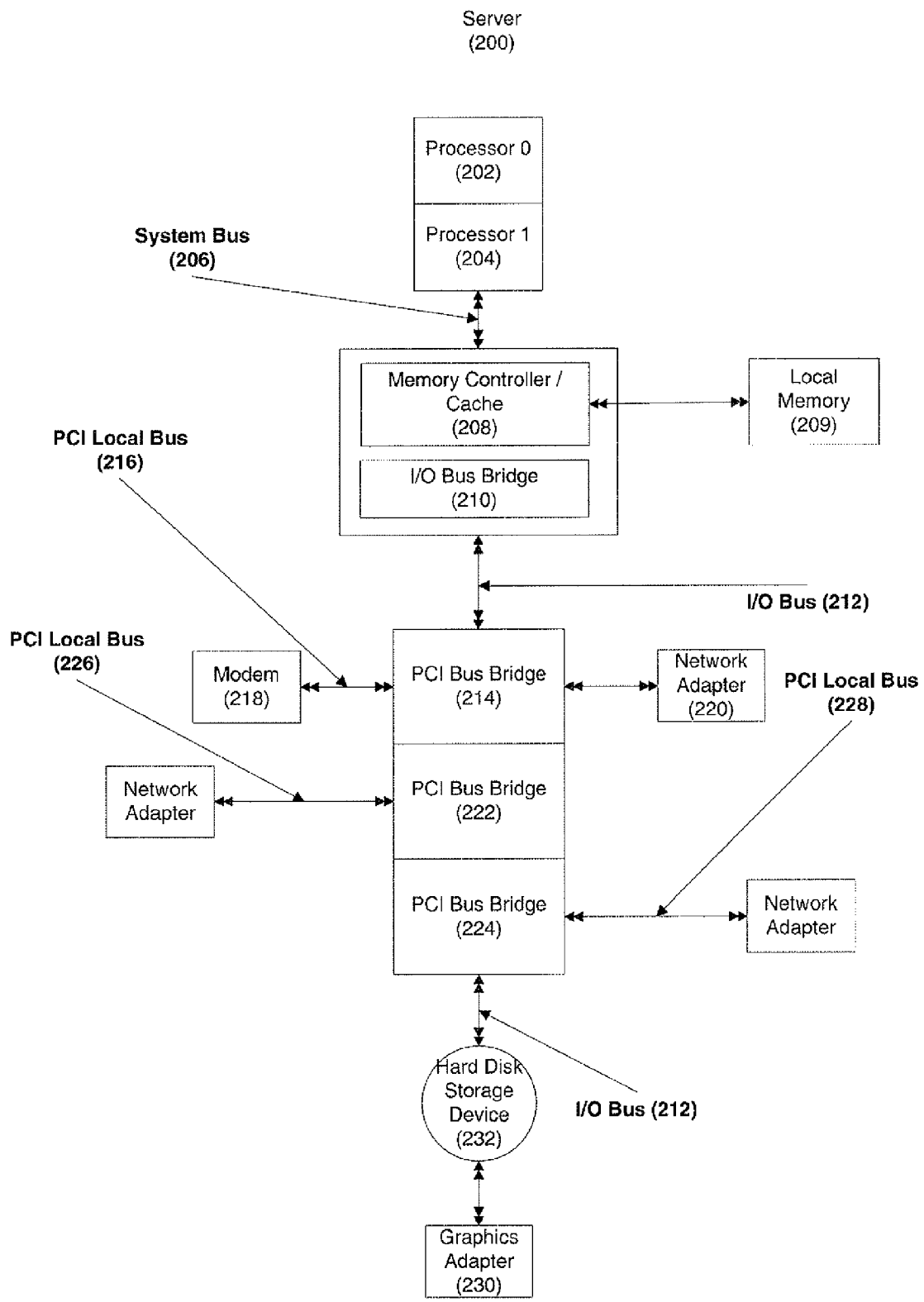
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communication links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an eServer pSeries system, a product of International Business Machines Corporation in Armonk, N.Y., running the Advanced Interactive Executive (AIX) or Linux operating systems.

Figure 3:
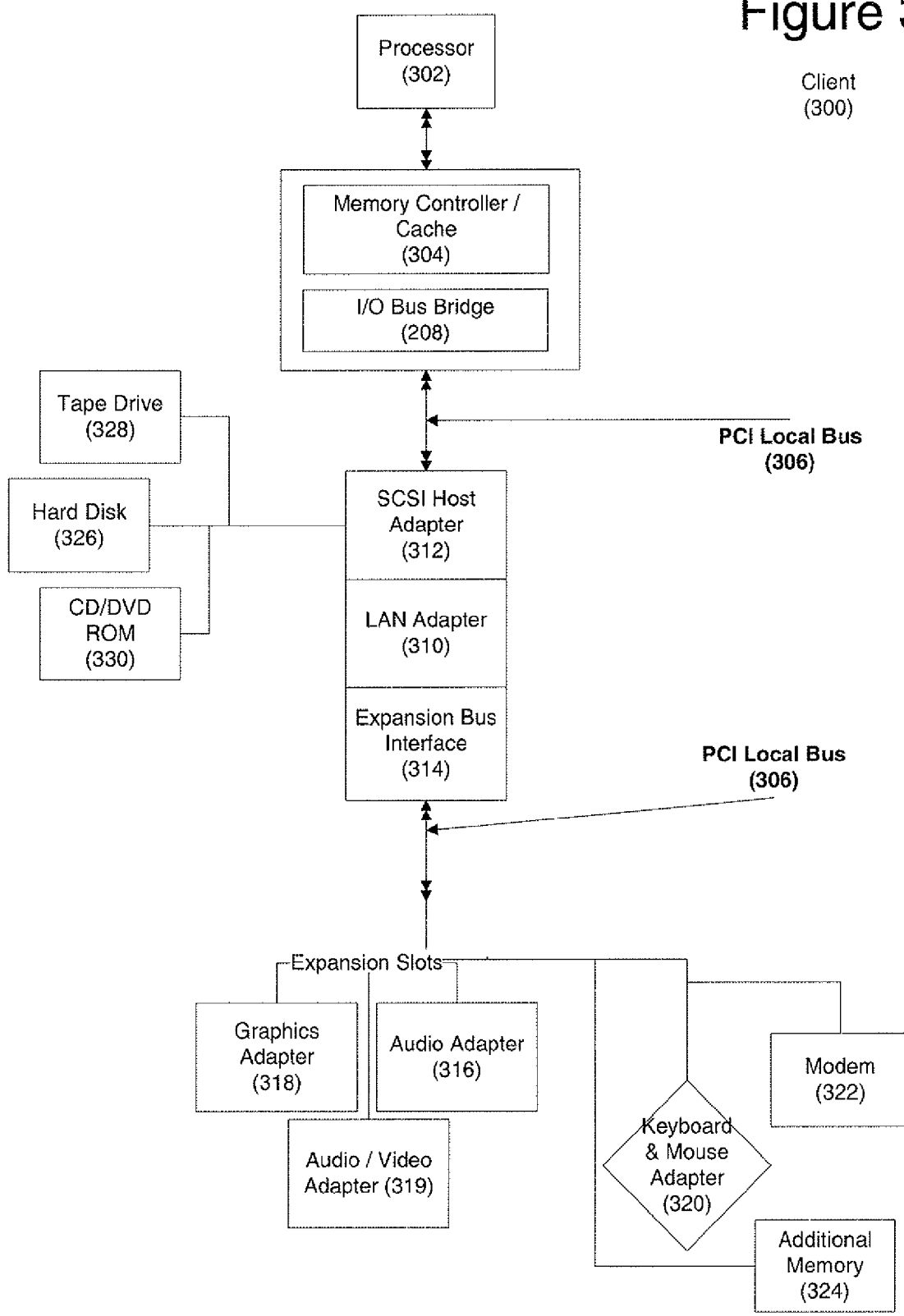
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD/DVD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and the above-described examples are not meant to imply architectural limitations. For example, data processing system 300 also may be a notebook computer or hand-held computer in addition to taking the form of a PDA. Data processing system 300 also may be a kiosk or a Web appliance.

Figure 4:
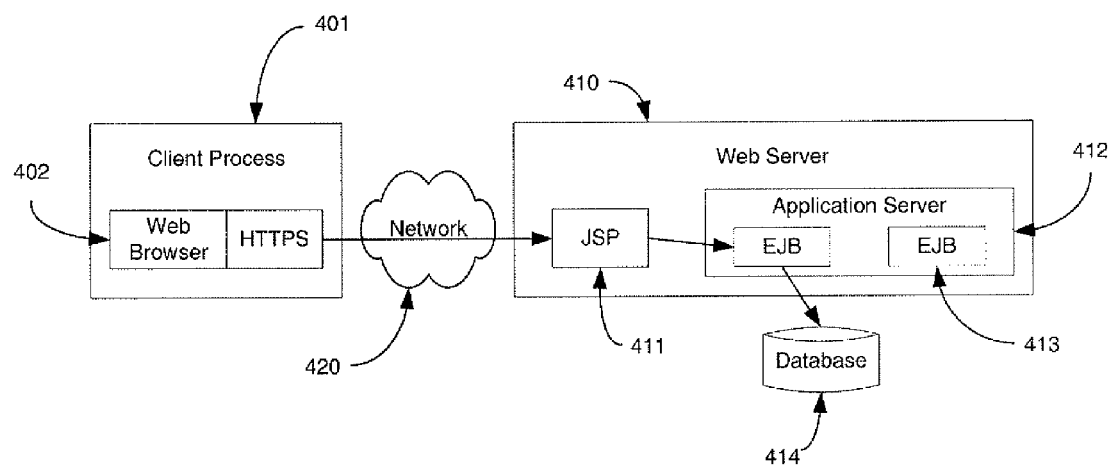
FIG. 4 depicts the interaction between a secure client and a Web Server across a network connection in accordance with a preferred embodiment of the present invention.

FIG. 4 depicts the interaction between a secure client and a Web Server across a network connection in accordance with a preferred embodiment of the present invention. The present invention is a web-based application that concurrently supports remote clients throughout the world. The client 401 accesses the web server 410 through a network 420 with a standard web browser 402 employing secure hypertext transfer protocol (HTTPS). Interaction with the web server 410 is through a Java Server Page (JSP) 411 employing remote method invocation (RMI). The web server 410 completes the data transfer through an Application server 412 which utilizes Enterprise Java Beans (EJB) 413. The EJBs 413 exchange data through a Relational DataBase Management System (RDBMS) 414.

Figure 5:
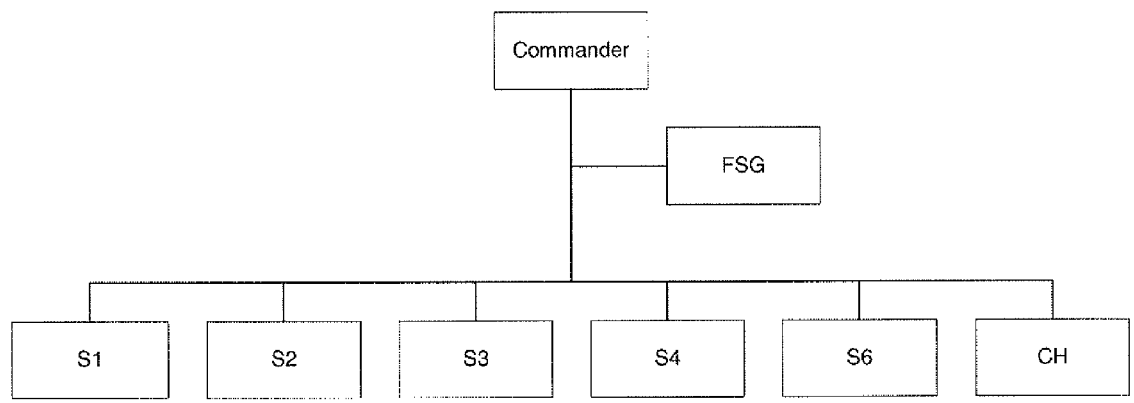
FIG. 5 illustrates the responsibilities of members of the unit staff.

The present invention replicates the responsibilities of a military staff, which report to a commander. The key staff is usually comprised of six members:

S1. Personnel
S2. Security
S3. Training/Operations
S4. Logistics
S6. Communications/Information Systems
CH. Chaplain This relationship is depicted in FIG. 5. Although each member has independent activities to perform, the invention creates a common thread between them based upon the personnel and equipment assigned to the unit. FIG. 5 also includes the relationship of the Family Support Group (FSG) to the unit (described in more detail below).

Figure 6A:
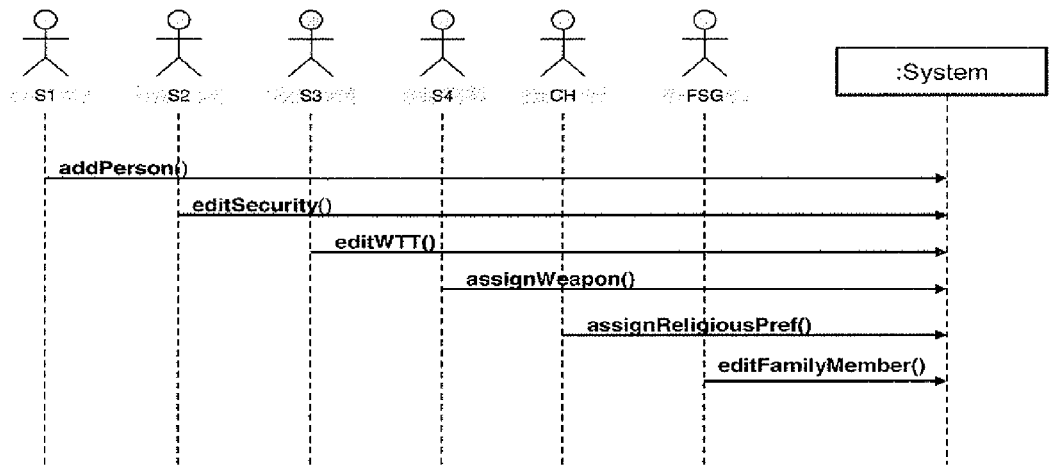
FIG. 6A illustrates the interrelationship between the staff members as new personnel are added.

FIG. 6A illustrates an example interrelationship between the staff members which occurs when new personnel are added. As the S1 adds personnel to the unit, the other members of the staff are instantly updated, which allows them to perform their responsibilities with respect to their section: the S2 edits the security related records, the S3 edits the training records, the S4 edits equipment records, the chaplain edits religious (and personal) issues, and the Family Support Group edits the family member records.

Figure 6B:
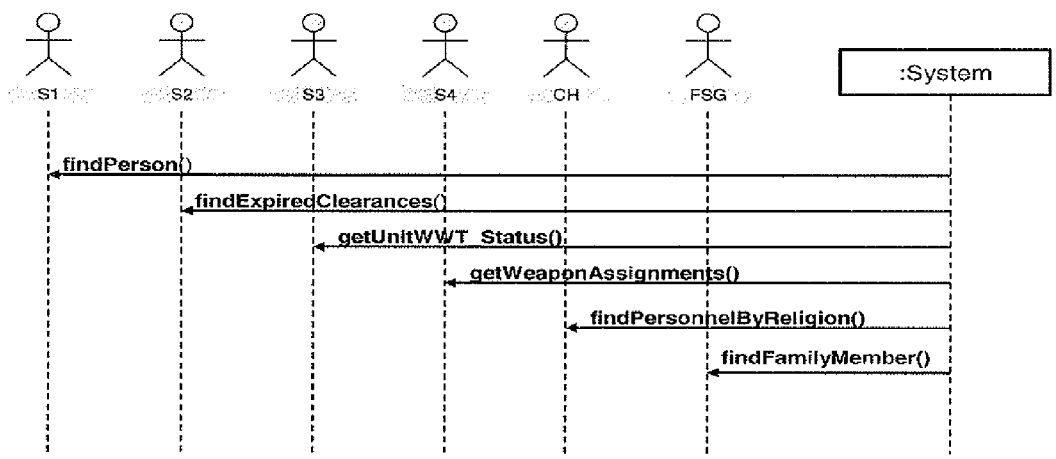
FIG. 6B illustrates retrieval of information by staff members according to their respective queries for information.

For the purpose of retrieval of information (illustrated in FIG. 6B), every staff member is interested in his own queries for information. Since the system maintains the information, all requests offer the most up-to-date independent views for any reports.

In a preferred embodiment of the present invention, there are four types of individuals who will access the system: system administrator, unit administrator, unit member, and the family support group.

Table 1 lists each type of person accessing the system and his assigned function.

TABLE 1

| Actor | Assigned Tasks |
|---|---|
| System Administrator | Person assigned to administer the application<br>Manages the Unit Administrators<br>Manages System Billing |
| Unit Administrator | There is usually one Unit Administrator per unit.<br>Manages the creation, and removal of user login(s)<br>Manages the security level of the user(s)<br>Manages the Payment for the Service |
| Unit Member | Any person assigned to the unit.<br>Allowed to view only those pages allowed by the Unit Administrator |
| FSG | Person assigned to manage the Family Support Program<br>May be civilian or military |

Figure 7A:
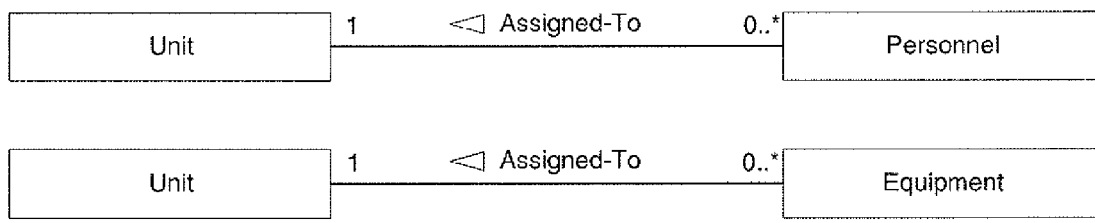
FIG. 7A depicts a One-to-Many relationship that relates those items which belong to a unit.

The conceptual model of the present invention can be depicted by two relationships. The first relationship is One-to-Many (1-∞), depicted in FIG. 7A. This is the simplest of the relations and relates to all those items which belong to a unit, e.g., Personnel, Weapons, Masks, Additional Duties, etc.

Figure 7B:
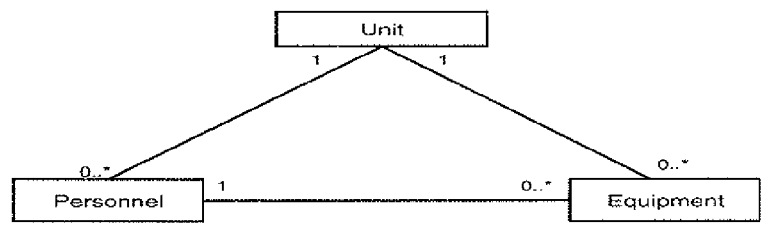
FIG. 7B depicts a Many-to-Many relationship between the entities within a unit.

The second relationship is Many to Many (∞-∞), depicted in FIG. 7B. This relation illustrates how an entity (Unit) can have a relationship to two other entities (Personnel and Equipment), while those entities have their own relationship.

Figure 7C:
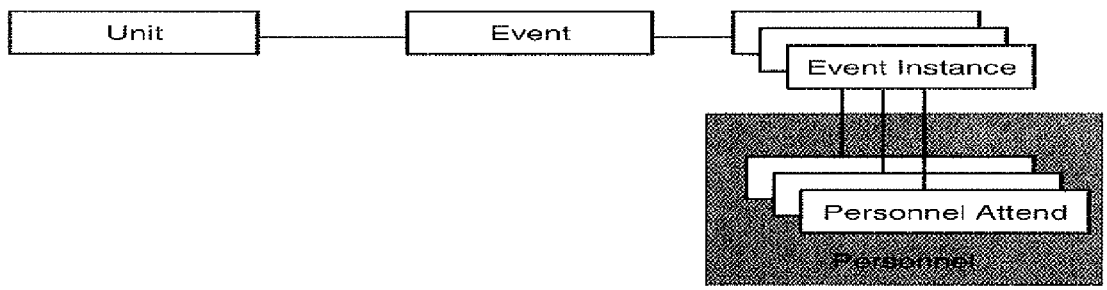
FIG. 7C depicts a Many-to-Many relation, wherein an event occurs on several occasions.
Figure 7D:
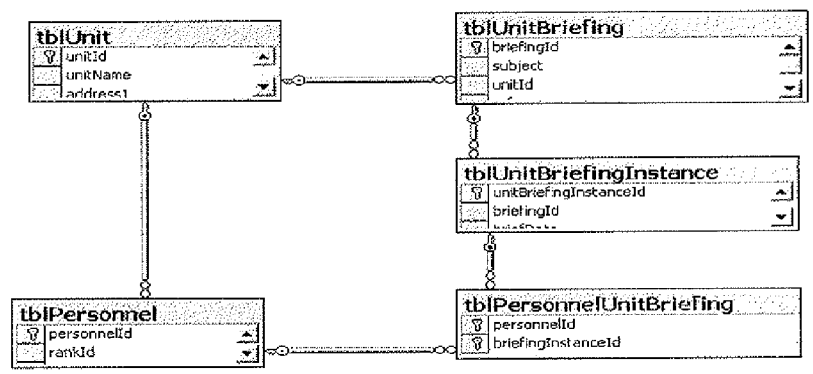
FIG. 7D illustrates an example of how the relationship in FIG. 7C are modeled in the database.

There also exists a more complex version of the Many-to-Many relation. In this example, a unit may have one event which occurs on several occasions. During each occasion (or instance) it is attended by different personnel. This relationship is depicted in FIG. 7C. Examples of this behavior would be events such as Briefings, Missions, Training Exercises, and the Army Physical Fitness Test (APFT). FIG. 7D illustrates an example of how this relationship would be modeled in the database. In this case, a unit performs briefings which are attended by unit personnel.

To accurately reflect the relationships within the unit, there are two graphical perspectives, one from the unit's perspective and one from the personnel (unit member's) perspective. The present invention ties these two perspectives together, creating a bi-directional flow of information.

Figure 8A:
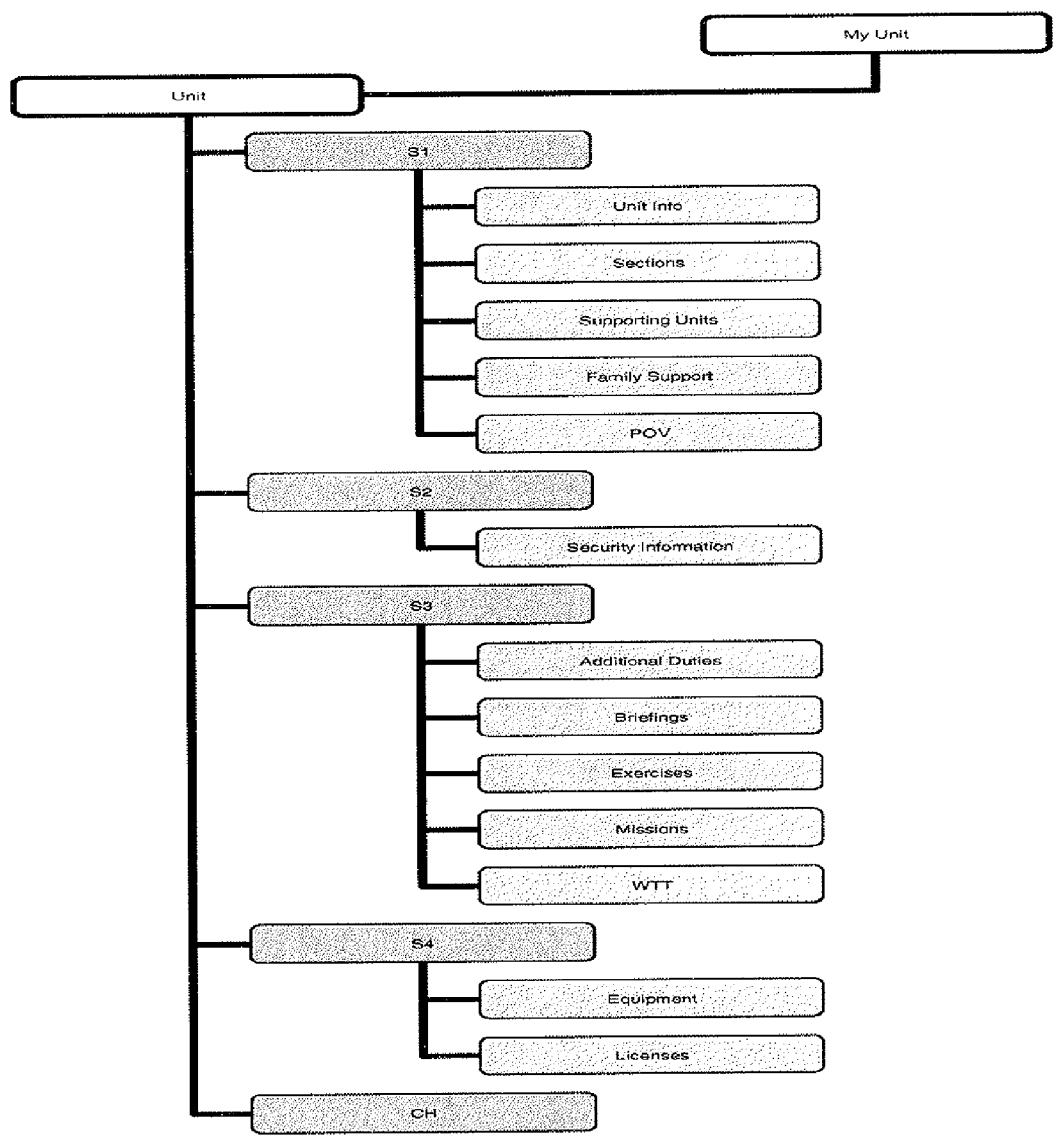
FIG. 8A is an organizational chart illustrating relationships from the unit perspective.

FIG. 8A is an organizational chart illustrating relationships from the unit perspective. The unit perspective is composed of the primary staff sections (S1, S2, S3, S4, CH) and their respective areas of responsibility. Each staff member accesses a unique set of screens which allow the modification of unit-level information and the dynamic assignment of personnel to positions, duties, or equipment. In one embodiment, a report tab is available to each staff member which encompasses his respective reports.

Figures 9A, 9B:
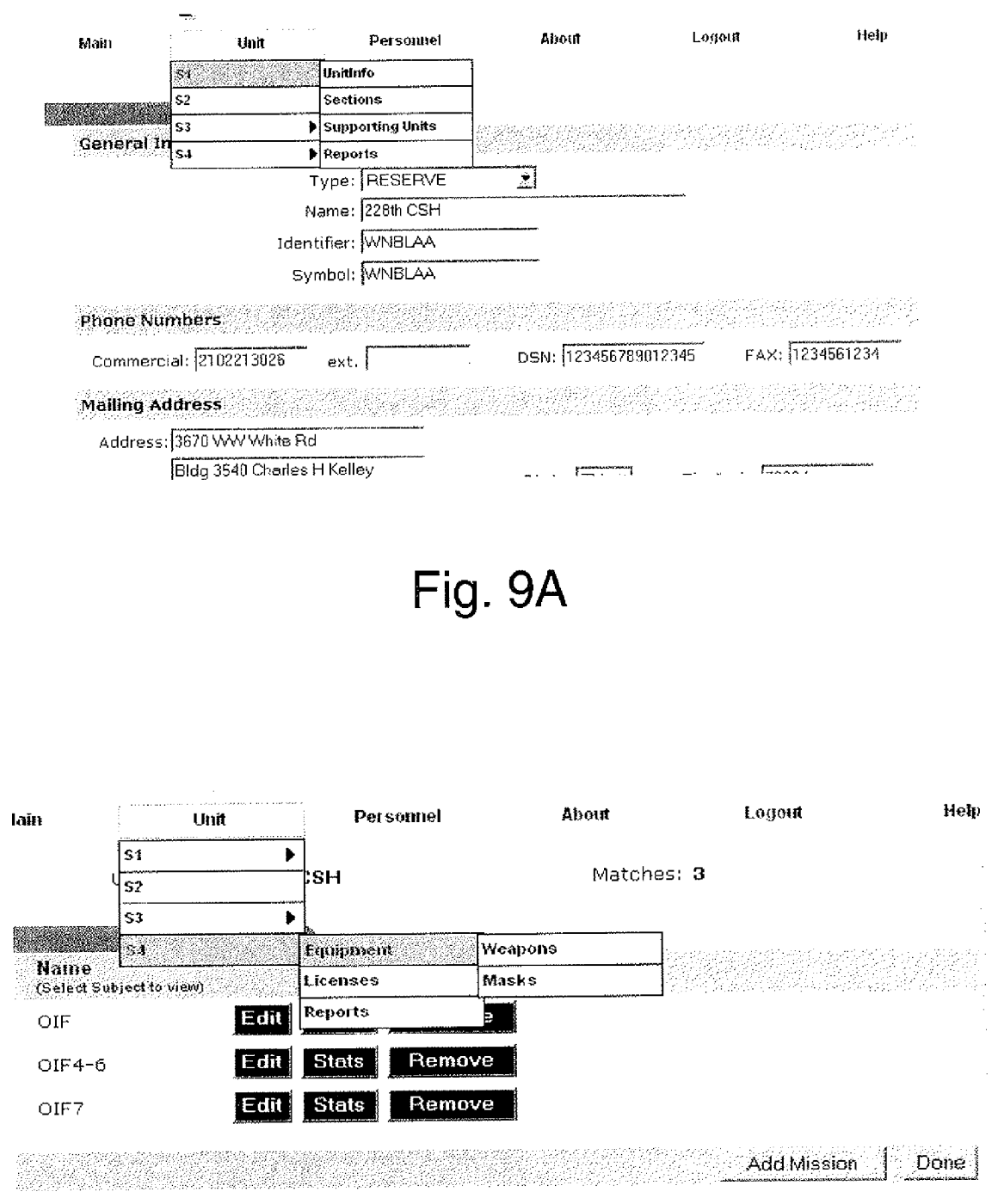

FIG. 9A is a sample screen depicting the tree-like access to information from the perspective of the unit staff. This visual model is implemented for all menus. As can be seen in the figure, the report includes information fields related to personnel (S1) information. In this instance, the S1 moves the cursor over the S1 menu.

FIG. 9B is a sample screen for equipment from the unit staff perspective. In this figure, one can see drop-down menus related to equipment and resource allocation. The S4 moves the cursor over S4, Equipment to view the lowest level of options available.

Figure 8B:
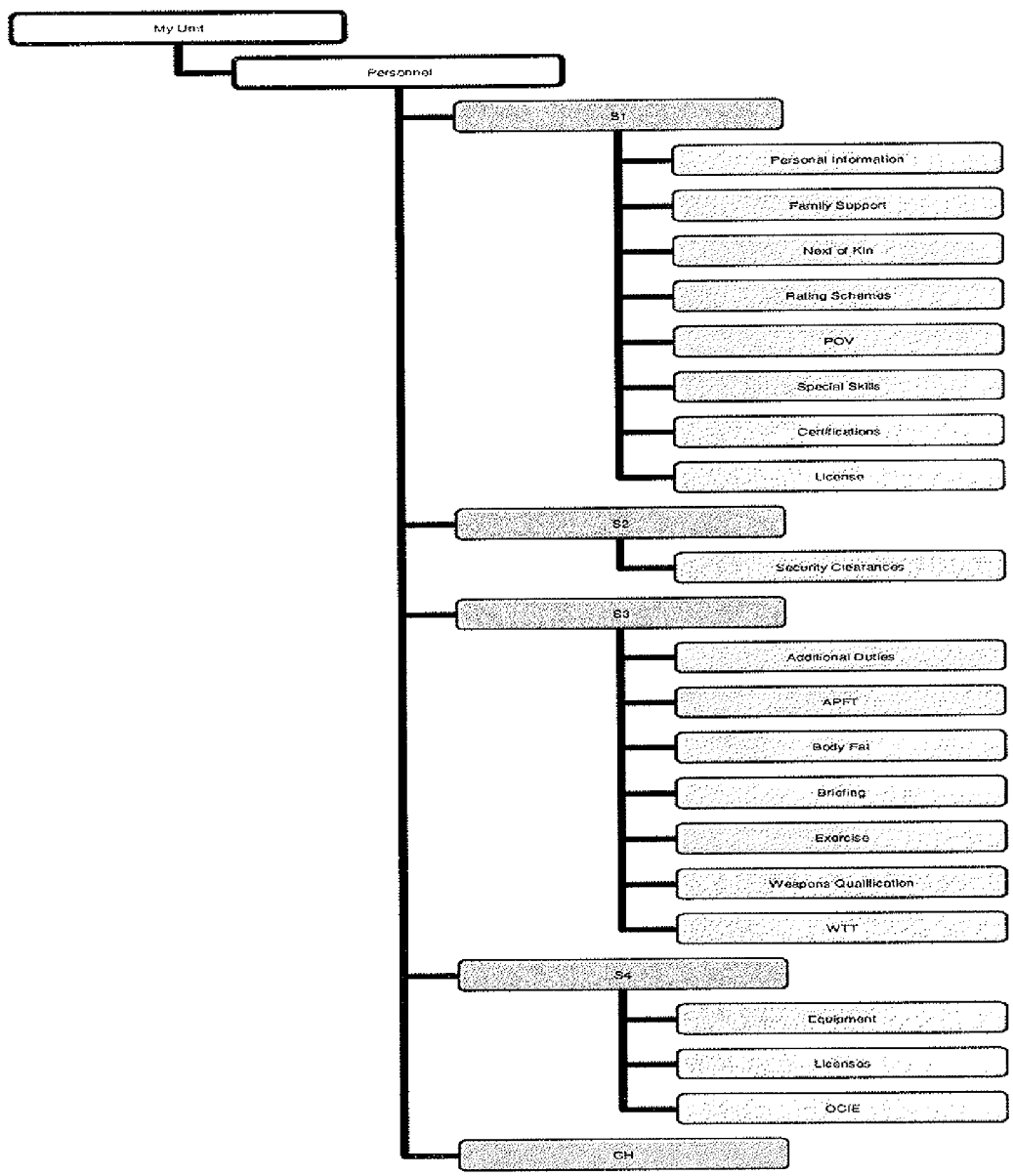
FIG. 8B is an organizational chart illustrating relationships from the personnel perspective.

FIG. 8B is an organizational chart illustrating relationships from the personnel perspective. The personnel perspective is composed of information for each member of the unit organized according to unit administrative sections (i.e. S1, S2, S3, S4). The invention allows two distinct categories for personnel: assigned and unassigned. Any person active within the unit is classified as "assigned," and any person that has left the unit is classified as "unassigned." (In the preferred embodiment, personnel are never removed from the unit, but simply unassigned.) When a person is unassigned, only the information relating to position, training, and equipment is removed.

Figures 9C, 9D:
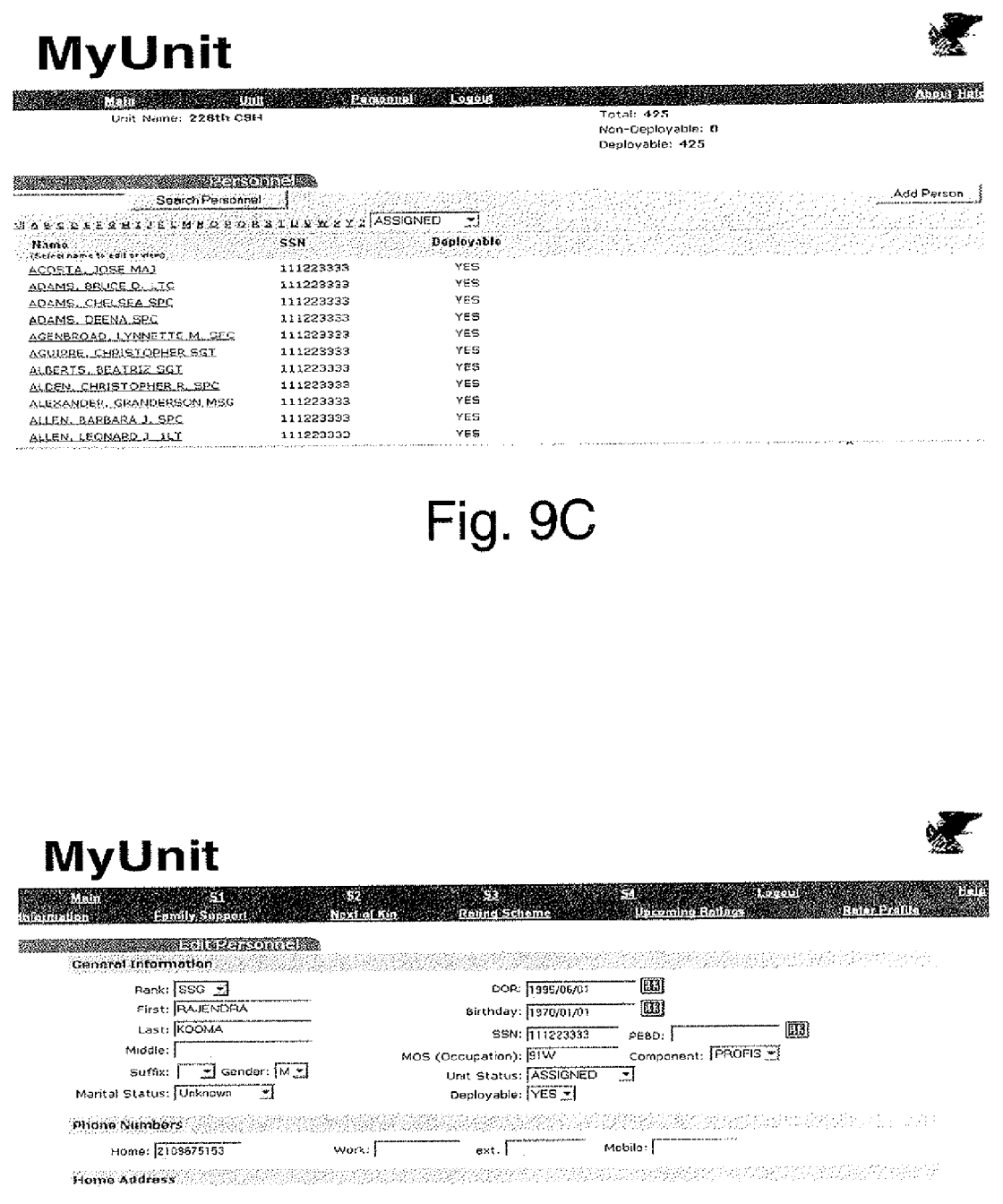

FIG. 9C is a sample screen of the unit personnel. From the main menu, when the Personnel tab is selected, a page displays all the personnel assigned to the unit. Changing the drop-down menu to unassigned will display a similar list with those members who have been unassigned from the unit.

FIG. 9D is a sample screen of the options available when one of the personnel is selected (as a hyperlink) from the screen depicted in FIG. 9C. To effectively categorize the information which reflects each person, the tabs above the selected person are divided identical to the unit administrative partitions: S1, S2, S3, S4, and CH. This allows a user to effectively navigate and update information on a page by page basis and allow page-level security to be implemented.

In addition to monitoring unit activities, the invention includes an extensive subsystem dedicated to family support. Integration is accomplished by linking the personnel data to family members, and volunteers to the Family Support Group (FSG). FIG. 9E shows a sample screen of the family information from the personnel perspective. From the personnel perspective, unit members are allowed any number of Family Members who they choose to be added. FIG. 9F is a sample screen for editing a family member. The order in which members are contacted is selected through a drop-down menu named "Order of Contact." The results of the edit page are embedded in a USARC Form 107-R (Family Information Data Worksheet) which is traditionally maintained by a unit prior to deployment.

From the unit perspective, the S1 can cross reference personnel by family member and vice versa. An email and telephonic contact roster are also available for individual members or all members. FSG volunteers are also tracked in addition to the hours that they have performed as project participants. Since the FSG may be operating over a large geographic region, a full suite of reports are available by entering a zip code (variable length between one to five digits) to select those family members within a certain area.

The invention has two primary levels of security. The first level comprises standard Internet security features such as 128 bit encryption and similar protocols. The second security level comprises user-level security, wherein access to unit and personnel information is determined according to a person's relationship to the unit. In the preferred embodiment, there are three types of users:

System administrator: There is one sysadmin that administers the system as a whole. This individual can/will:
  a. Manage the unit admin's:
    i. Logins
    ii. Billing
    iii. Service
    iv. Customer support
  b. Add and remove units
  c. Access system-level reports Unit administrator: There is one unit administrator per unit. This individual can/will:
  a. Enroll/terminate the service
  b. Submit and Review their Billing information
  c. Manage (add/edit/remove) UM's and their page-based permissions Unit member: Although a unit is composed of many personnel, unit members are defined as those personnel with a login to the system. They are only allowed to view those pages allowed by the Unit Admin.

The individual who enrolls for the service acts as the unit administrator; every unit has only one administrator. The unit administrator is the only individual who can add unit members to the system and assigns to them the pages that are accessible. Permissions can be altered at any time to allow or disallow navigation to any page of the application.

Figure 10:
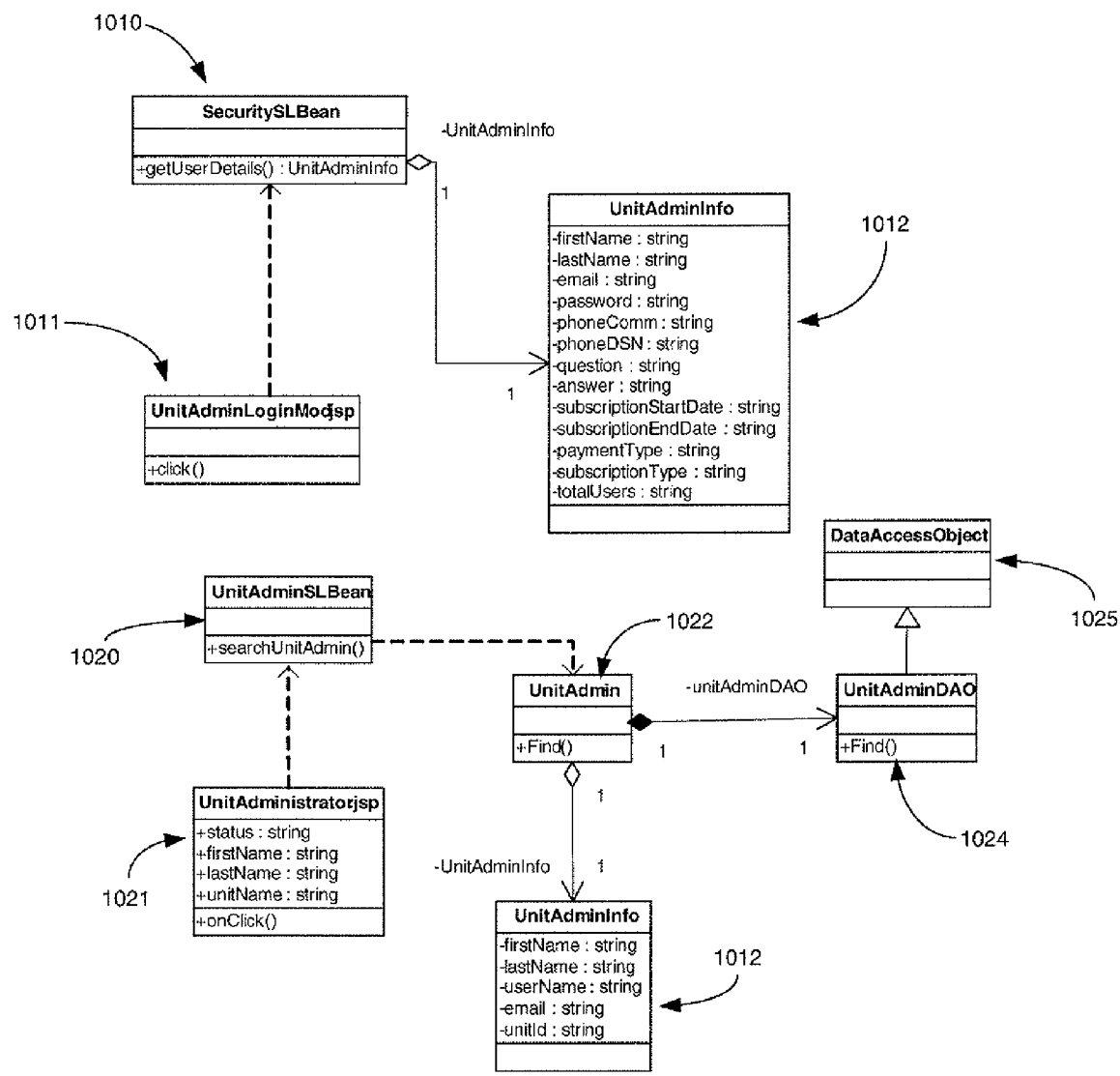
FIG. 10 is a class diagram for implementing security for the unit administrator.

FIG. 10 is a class diagram for implementing security for the unit administrator in accordance with a preferred embodiment of the present invention. It depicts the relationship between the classes involved in the implementation of security for the unit administrator (UA).

The SecuritySLBean 1010 is a stateless session bean that provides maintenance services for personnel (also referred to as Unit Members or UM), Unit Administrator (UA), and merchant information. It also provides other services like password verification and payment processing. The UnitAdminLoginModJSP 1011 is a Java Server Page (JSP) for adding and editing a UA.

The UnitAdminInfo 1012 is an information (value) object of a UA. It contains all properties/fields of a UA, including:
  a. Email and password
  b. Subscription Start and Stop date
  c. Total Number of Users
  d. Method of Billing Items b, c, and d are adjustable.

From the perspective of the system administrator, the UA's must be available for querying. The second portion of the diagram illustrates the relationships to track UA's by first name, last name, unit name, and status.

The UnitAdminSLBean 1020 stateless session bean that provides maintenance services of a UA. It also offers the ability to search units and UA's. The UnitAdministratorJSP 1021 is a Java Server Page for searching UA's based on filter criteria. The results from the query are returned as a Collection which is displayed as a list.

The UnitAdmin 1022 is a business object that contains the UnitAdminInfo and UnitAdminDAO objects. It provides the pass through methods for UnitAdminDAO object. UnitAdminDAO 1024 is the Data Access Object (DAO) class for the UA and extends from DataAccessObject 1025. It possesses both find (search) and update operations for UA's. The DataAccessObject 1025 is an Abstract class that contains the database operations such as open, close, create statement and create prepared statements. This is the super class of all the DAO objects within the system.

Figure 11A:
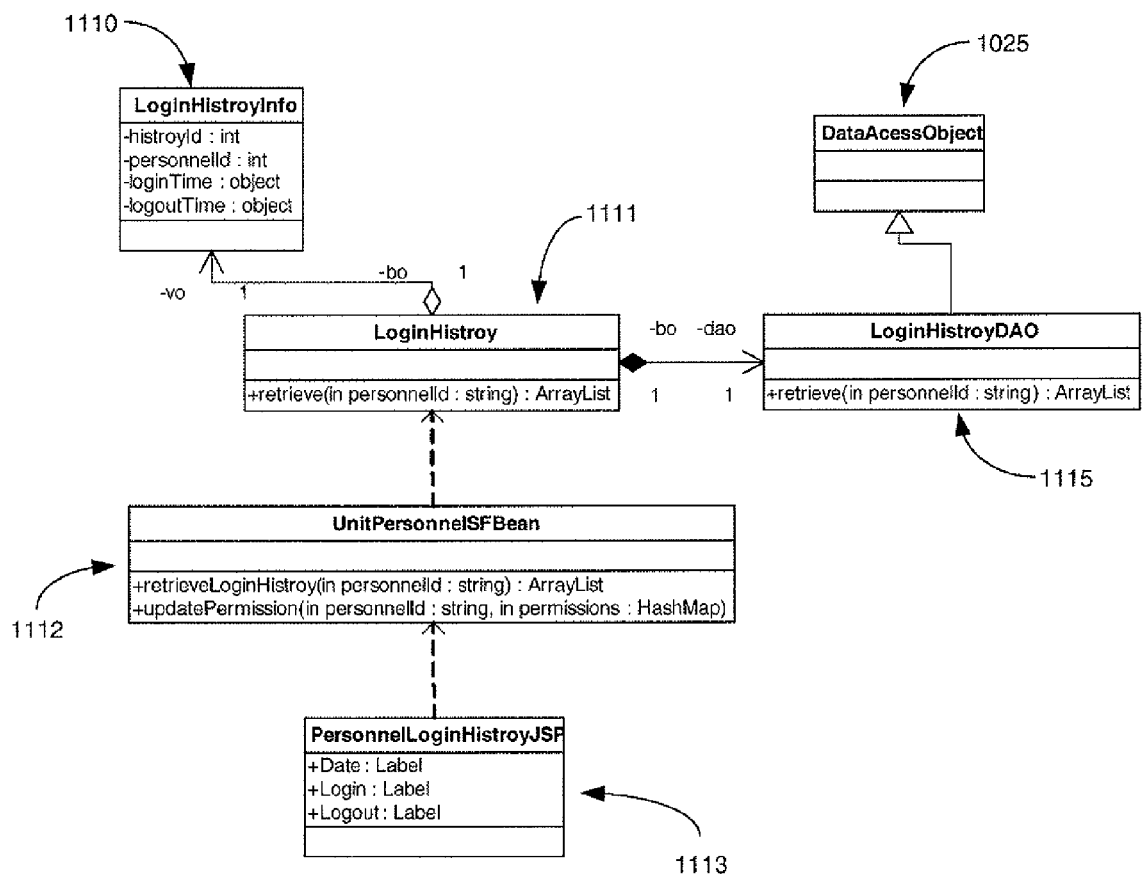
FIG. 11A is a class diagram for implementing a user login history for the unit administrator security.

FIG. 11A is a class diagram for implementing the user login history for the unit administrator security. In order to track who accesses the application, a subset of objects named "History" coordinate with the Personnel object to work together to log the date and time of each logon and log-off.

LoginHistoryInfo 1110 is an information (value) object for storing the login history. It contains the login and logout time for a user. The LoginHistory 1111 is a business object that contains the LoginHistoryInfo and the LoginHistoryDAO object. It provides the pass through methods to the LoginHistoryDAO object.

The UnitPersonnelSFBean 1112 is a stateful session bean that manages the Personnel Entity Bean. It provides methods for retrieving associated Sections, Ratings, APFT, and Rank for personnel. It also provides methods for retrieving equipment (e.g., Weapons and Masks) for a particular unit. The PersonnelLoginHistoryJSP 1113 is a JSP that displays the Login history for personnel. It displays the date and time of login and logout.

The LoginHistoryDAO 1115 is the DAO class for LoginHistory and extends from the DataAccessObject 1025. It possesses the concrete methods to retrieve, insert and update operations.

Figure 11B:
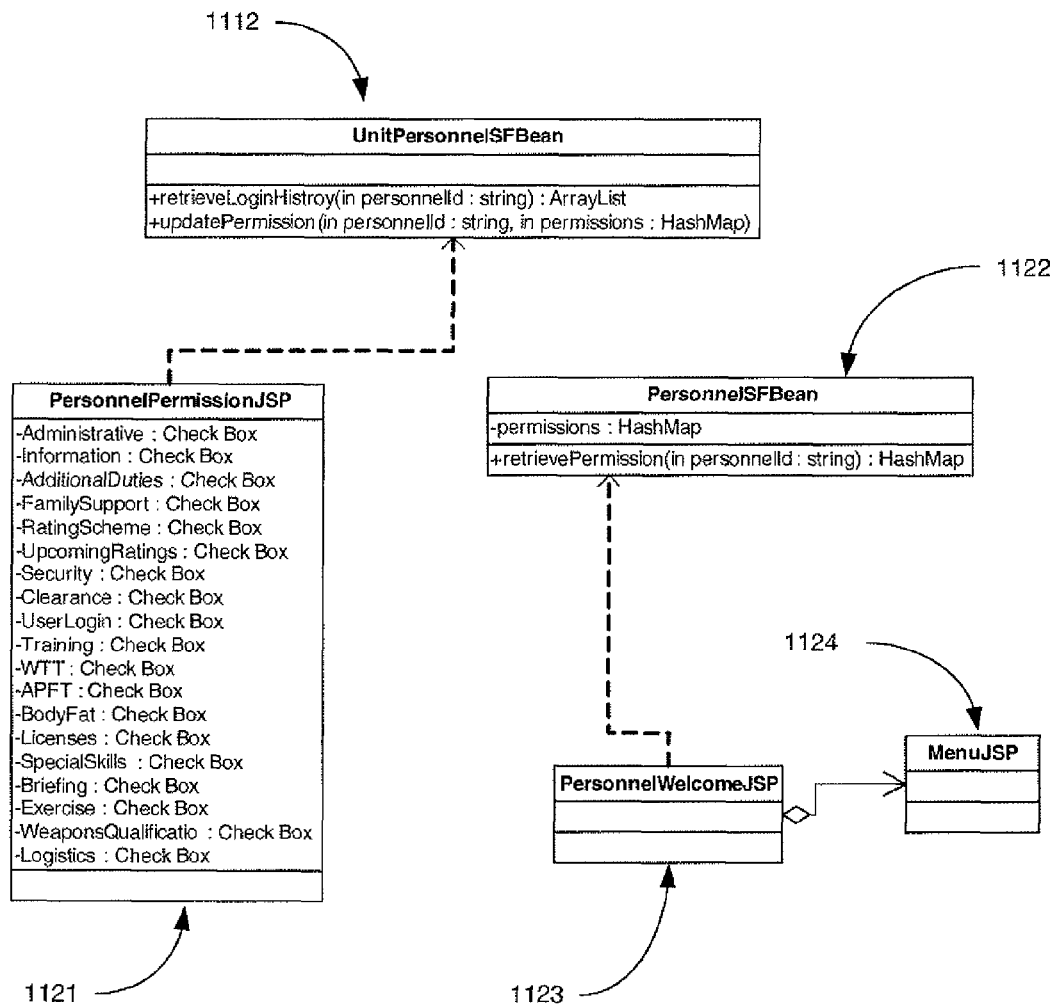
FIG. 11B is a class diagram for implementing user permissions for the unit administrator security.

FIG. 11B is a class diagram for implementing user permissions for the unit administrator security. UM's are allowed a login to the system by the UA. Once entered, they may only view those web pages permitted by the UA. The left-hand portion shows an example of all of the pages to the Permissions. The right-hand portion of the diagram shows the permissions of the UM which are retrieved whenever the UM logs in, and results in a customized MenuJSP.

PersonnelPermissionJSP 1121 is a JSP used by the UA to assign permissions for personnel within the system. The PersonnelSFBean 1122 is a stateful session bean that wraps the Personnel Entity bean. It provides methods for assigning/unassigning, e.g., masks, weapons, duties, APFT, Body Fat, Ratings, Family Member, Next of Kin, Weapon Qualifications, License, Special skills, Exercise, Section Position for Unit Members (UM).

The PersonnelWelcomeJSP 1123 is the welcome JSP for personnel. This JSP is called when a UM logs-in. It records the login history information and retrieves the UM's permission information. Finally it forwards control to the PersonnelListMod JSP.

The MenuJSP 1124 loads the menus and menu items based on the role of the user logging into the system. For UM login, it checks the permissions before displaying the menu and menu items.

The present invention supports Active Component (AC), Reserve Component (RC), and National Guard (NG). All functionality is common to all land and air units; the branch is immaterial. The invention supports any size unit and members of all components, i.e. Active Component, Active Guard and Reserve (AGR), Professional Officer Filler System (PROFIS), National AMED (Army Medical Department) Augmentation Detachment (NAAD), and Troop Program Unit (TPU). It is also supported on current DOD hardware from any location capable of accessing the Non-classified Internet Protocol Router Network (NIPRNET).

The invention provides cross level integration of information by allowing information sharing among staff sections such as Personnel, Training Plans, Logistics/Equipment, Licensing/Certifications, Operations, and Briefings.

The present invention increases personnel efficiency by supporting staff functions S/G-1 through S/G-4. The invention also saves computer disk space and shelf space by eliminating the storage of countless spreadsheets and word processing documents, as well as binders, folders, and paper. Because staff members can access information from a common source there is no need to continually send emails and share documents via removable media. In addition, the continuity of information in the application means the rotation of key personnel will not affect the staff and their reporting ability. Unit information is always available when staff members need it.

A great advantage of the present invention is its ease of use because no formal training is required. From the GUI, navigation of the interface is designed to mirror a standard military staff, wherein functionality is available through a tree-like drop-down for each section.

The invention also offers scalability. It is available on standard web browsers and accessible via other web access devices. Server-side upgrades have no impact on the clients. The application can also be expanded to exchange data with external systems. The invention can be implemented using non-proprietary, open source tools, which allows for an open development process.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A system for providing graphically presented administrative support on a display for a military unit, the system comprising:
   (a) a server-side database containing information about the military unit organized with a plurality of staff function levels, including at least two or more of personnel, security, training, operations, logistics, communications, information systems, and chaplain; and
   (b) at least one client-side browser application that provides a secure network connection to said database, allowing unit members to access the database, without any intervention from any other unit member, to retrieve and edit said unit information from any location providing Internet access;
   wherein unit members can access administrative information specific to their respective staff responsibilities, including information maintained by different staff level functions but relevant to an accessing member's administrative responsibility; and
   wherein edits to military unit information in the database by any military unit member can be immediately accessed by other military unit members according to their respective administrative staff responsibilities and authorization.

2. The system according to claim 1, wherein the military unit administrative information and staff functions include the following areas:
   (i) personnel;
   (ii) security;
   (iii) training and operations;

(iv) logistics;
(v) communications/Information Systems;
(vi) chaplain.

3. The system according to claim 1, further comprising a subsystem containing information for a family support group, wherein family member information is cross-referenced with military unit personnel information.

4. The system according to claim 1, wherein military unit information is presented graphically from a unit perspective comprising administrative staff sections and their respective areas of responsibility.

5. The system according to claim 4, wherein each administrative staff section member with authorization can access a unique set of screens that allow the modification of unit-level information and the dynamic assignment of personnel to positions, duties, and equipment.

6. The system according to claim 1, wherein military unit information is presented graphically from a personnel perspective comprising information for each member of the military unit organized according to military unit administrative sections and staff functions.

7. The system according to claim 1, wherein each military unit member can only access administrative information as specified by a military unit administrator.

8. A computer program product in a computer readable medium, for providing graphically presented administrative support on a display for a military unit, the computer program product comprising:
   (a) first instructions for managing information about the military unit in a server-side database organized according to unit staff level function, to include at least two or more of personnel, security, training, operations, logistics, communications, and information systems; and
   (b) second instructions for accessing said database via a client-side browser application that provides a secure network connection to the database, allowing military unit members to retrieve and edit said unit information from any location providing Intranet/Internet access without any intervention from any other unit member;
   wherein military unit members can access administrative information specific to their respective responsibilities but not limited by staff level affiliation; and
   wherein edits to military unit information in the database are limited by staff level affiliation and can be concurrently accessed by other unit members according to their respective administrative responsibilities and authorization.

9. The computer program product according to claim 8, wherein the military unit administrative information includes the following staff areas:
   (i) personnel;
   (ii) security;
   (iii) training and operations;
   (iv) logistics;
   (v) communications/Information Systems;
   (vi) chaplain.

10. The computer program product according to claim 8, further comprising third instructions for managing information for a family support group, wherein family member information is cross-referenced with military unit personnel information.

11. The computer program product according to claim 8, wherein military unit information is presented graphically from a military unit perspective comprising administrative staff sections and their respective areas of responsibility.

12. The computer program product according to claim 11, wherein each administrative staff section member with authorization can access a unique set of screens that allow the modification of unit-level information and the dynamic assignment of personnel to positions, duties, and equipment.

13. The computer program product according to claim 8, wherein military unit information is presented graphically from a personnel perspective comprising information for each member of the military unit organized according to unit administrative sections.

14. The computer program product according to claim 8, wherein each military unit member can only access administrative information as specified by a military unit administrator.

15. A method for managing data information graphically presented on a display for administrative support to a military organization at the organizational-unit level, comprising the steps of:
   providing a secured military organizational unit data processing network with a server-side database containing administrative information for the military organizational unit specific to one or more of a plurality of staff level functions, including at least two or more of personnel, security, training, operations, logistics, communications, and information systems, and accessible to all military organizational unit personal with relevant administrator-level clearance;
   operating a client-side browser application that enables a secure network connection to said database, allowing authorized military organization unit members to access and view database information from any location providing Internet access without any intervention from any other unit member;
   allowing military organization unit members accessing the database and having necessary administrator-level clearance to retrieve and edit administrative information specific to the military organization unit member's staff level responsibility and without any intervention from any other unit member;
   wherein updates to military organizational unit information in the database are limited by staff level assignment but can be immediately accessed by other organization unit members according to their respective administrative responsibilities or clearance, even if assigned to a different staff level function.

16. The method of claim 15, wherein the staff level includes a plurality of responsibility areas that includes:
   an organization unit chief;
   personnel;
   security;
   training and operations;
   logistics;
   communications/Information Systems;
   chaplain; and
   family support.

17. The method of claim 15, wherein a organization unit member having staff level responsibility can access a unique set of screens that allow the modification of organizational unit-level information and the dynamic assignment of personnel to positions, duties, and equipment.

18. The method of claim 15, wherein organizational unit information is presented graphically from a personnel perspective comprising information for each member of the organizational unit organized according to organization unit-level administrative sections.

19. The method of claim 15, wherein access to the secured military organizational unit data processing network is based on a standard Internet security protocol.

20. The method of claim 15, wherein access to database information is based on an organization unit member relationship to the organizational unit, classified according to at least one of the following types:

a system administrator with global administrative access;
an organization unit administrator assigned to each unit; and
an organization unit member with access determined by either the system administrator or the organization unit administrator.

* * * * *